United States Patent
Esposito et al.

(10) Patent No.: US 9,306,442 B2
(45) Date of Patent: Apr. 5, 2016

(54) MOTOR FOR A ROTATABLE AND ILLUMINABLE POINTER

(75) Inventors: Rodolfo Esposito, Colombier (CH); Nicola Gobeli, Solothurn (CH); Rufino Leon, Courtaman (CH)

(73) Assignee: JUKEN SWISS TECHNOLOGY AG, Grenchen (CH)

( * ) Notice: Subject to any disclaimer, the term of this patent is extended or adjusted under 35 U.S.C. 154(b) by 170 days.

(21) Appl. No.: 14/004,978

(22) PCT Filed: Apr. 18, 2011

(86) PCT No.: PCT/EP2011/056163
§ 371 (c)(1),
(2), (4) Date: Sep. 13, 2013

(87) PCT Pub. No.: WO2012/143038
PCT Pub. Date: Oct. 26, 2012

(65) Prior Publication Data
US 2014/0028131 A1    Jan. 30, 2014

(51) Int. Cl.
*H02K 11/00* (2006.01)
*H02K 99/00* (2014.01)
*G01D 13/26* (2006.01)

(52) U.S. Cl.
CPC ............ *H02K 57/006* (2013.01); *G01D 13/265* (2013.01)

(58) Field of Classification Search
CPC ............................ G01D 11/28; H02K 57/006
USPC ............................. 310/73; 362/23.01–23.22
See application file for complete search history.

(56) References Cited

U.S. PATENT DOCUMENTS

| | | | |
|---|---|---|---|
| 6,408,784 B1* | 6/2002 | Ross | 116/288 |
| 8,029,166 B2* | 10/2011 | Kerr et al. | 362/311.02 |
| 2002/0135995 A1 | 9/2002 | Fujita et al. | |
| 2003/0079672 A1* | 5/2003 | Kalashnikov et al. | 116/288 |
| 2005/0146893 A1 | 7/2005 | Ford et al. | |
| 2008/0168939 A1 | 7/2008 | Harada et al. | |
| 2008/0264328 A1* | 10/2008 | Birman et al. | 116/288 |
| 2008/0310141 A1* | 12/2008 | Mezouari | 362/30 |

(Continued)

FOREIGN PATENT DOCUMENTS

| | | | |
|---|---|---|---|
| DE | 102006055949 A1 | 6/2008 | |
| DE | 102008023623 A1 | 11/2008 | |

(Continued)

OTHER PUBLICATIONS

International Search Report dated Feb. 1, 2012.

(Continued)

*Primary Examiner* — Hanh Nguyen
(74) *Attorney, Agent, or Firm* — Cooper Legal Group LLC (57) ABSTRACT

The present invention relates to a motor designed for being mounted on a circuit board, the circuit board having a pointer side and a rear side. The motor can be used for rotating an illuminated pointer. The motor comprises a light conveying pointer shaft for projecting through the circuit board from the rear side of the circuit board to the pointer side of the circuit board. The pointer shaft is arranged to convey light to the pointer. The motor further comprises a light guide for conveying light from a light source mounted on the circuit board to a rear end of the pointer shaft, the rear end of the pointer shaft being on the rear side of the circuit board. Thus, the motor can be advantageously mounted on the rear side of the circuit board.

14 Claims, 8 Drawing Sheets

(56) References Cited

U.S. PATENT DOCUMENTS

2009/0038535 A1 2/2009 Morales et al.
2014/0233208 A1* 8/2014 Hamada et al. ............ 362/23.17

FOREIGN PATENT DOCUMENTS

| EP | 1258712 | A2 | 11/2002 |
| JP | 3170815 | | 7/1991 |
| JP | 09101182 | A | 4/1997 |
| JP | 11311547 | A | 11/1999 |
| JP | 2011039000 | A | 2/2011 |
| RU | 58718 | U1 | 5/2015 |
| WO | 2009124712 | A2 | 10/2009 |

OTHER PUBLICATIONS

1st Chinese Office action dated Apr. 1, 2015, 10 pages.
Russian Notice of Allowance dated May 15, 2015, 3 pages.
International Preliminary Report dated Aug. 5, 2013, 12 pages.
2nd Chinese Office action dated Sep. 25, 2015, 18 pages.

\* cited by examiner

MOTOR FOR A ROTATABLE AND ILLUMINABLE POINTER

TECHNICAL FIELD

The present invention relates to a motor for a rotatable and illuminable pointer. The motor can be, in particular, a miniature stepper motor to be used for instance for automotive instrumentation applications. The invention likewise relates to an assembly comprising the motor.

BACKGROUND OF THE INVENTION

Motors, such as miniature stepper motors, are widely used, for instance in the automotive industry. Today the automotive industry wants state-of-the-art products, and they also want to be more cost efficient. In an automotive instrument cluster, the pointers of each instrument must be adequately illuminated. The pointers can rotate in both directions in speedometers, revolution counters, fuel indicators, temperature indicators, etc. Each pointer, situated over a graduated dial, will indicate the current value, m which during daytime will be perfectly visible to the driver. During nighttime, the pointers have to be illuminated.

Large pointers usually require three light-emitting diodes (LEDs) each to illuminate the pointer over its 300 degree turning radius. The pointers are generally operated by stepper motors which have a pointer shaft for rotating the pointer. Alternatively the motors are shaftless, in which case the pointer has a shaft that can be connected to the motor. Stepper motors (or step motors) are brushless, synchronous electric motors that can divide a full rotation into a large number of steps. The motor's position can be controlled precisely without any feedback mechanism, as long as the motor is carefully sized to the application.

New generation motors, either shaftless or with a transparent shaft, guide the light of a single printed circuit board (PCB) mounted LED through the centre of the plastic shaft. As the light source is in the centre of the rotating pointer, the light distribution during the rotation stays constant. Thus, a shiftless solution or a transparent shaft motor offers constant illumination over the entire range of rotation, and it also saves the, cost of two LEDs. This concept works only if the motor is mounted on the front side of the PCB, and therefore the single PCB mounted LED illuminates the pointer shaft up through the bottom of the motor. Therefore, to ensure a homogeneous illumination of the pointer over its entire range of travel, a transparent shaft is preferred using only one centred LED. The whole cluster dial can be illuminated by several LEDs situated at various PCB locations. All of the illumination is designed so that the drivers view and interpretation of the instruments is as clear as possible.

However, due to space restrictions and new cluster technologies, there is a need to mount the motors on the rear side of the PCB. However, in doing so, there is no longer mechanical support or electrical power for the LED. This means that generally the pointer can no longer be illuminated through the shaft which results in an inhomogeneous illumination of the pointer.

It is the aim of the present invention to overcome the problems related to mounting the motors on the rear side of the PCB.

SUMMARY OF THE INVENTION

According to a first aspect of the invention, there is provided a motor for a rotatable and illuminable pointer as recited in the claims.

Thus, the motor according to the present invention can be mounted onto the rear part of the PCB. The structure of the light guide makes it also possible to install the light source on the PCB. The light source can be installed either on the rear side of the PCB or on front side of the PCB, in which case there would be a hole in the PCB through which the light could propagate into the light guide. Thus, the present invention solves all the problems related to the mechanical and electrical installation of the light source when the motor is rear mounted onto the PCB. As the light source is located on the PCB, it can be powered by the PCB. Furthermore, the light sources can be chosen and installed on the PCB by the customer himself instead of letting this be done by the motor manufacturer. This has the advantage that now the customer can choose LEDs that emit exactly the same type of light and intensity, and they can install these LEDs with respect to the cluster so that all the pointers in the cluster are illuminated in exactly the same way.

The present invention offers all of the benefits of a shaftless or transparent shaft motors, but the big benefit is the fact that the motor can be fitted on the rear side of the PCB.

According to a second aspect of the invention, an assembly is provided as recited in the claims.

Other aspects of the invention are recited in the dependent claims attached hereto.

BRIEF DESCRIPTION OF THE DRAWINGS

Other features and advantages of the invention will become apparent from the following description of non-limiting exemplary embodiments, is with reference to the appended drawings, in which.

DETAILED DESCRIPTION OF EMBODIMENTS OF THE INVENTION

An embodiment of the present invention will be described in the following in more detail with reference to the attached figures. The embodiment of the present invention is described in the context of stepper motors, although the invention is not limited to the stepper motors.

The present invention relates to motors that are arranged to rotate a pointer through a pointer shaft. The present invention provides a new and inventive way of directing the light into the shaft even when the motor is mounted on the PCB.

Figure 1:
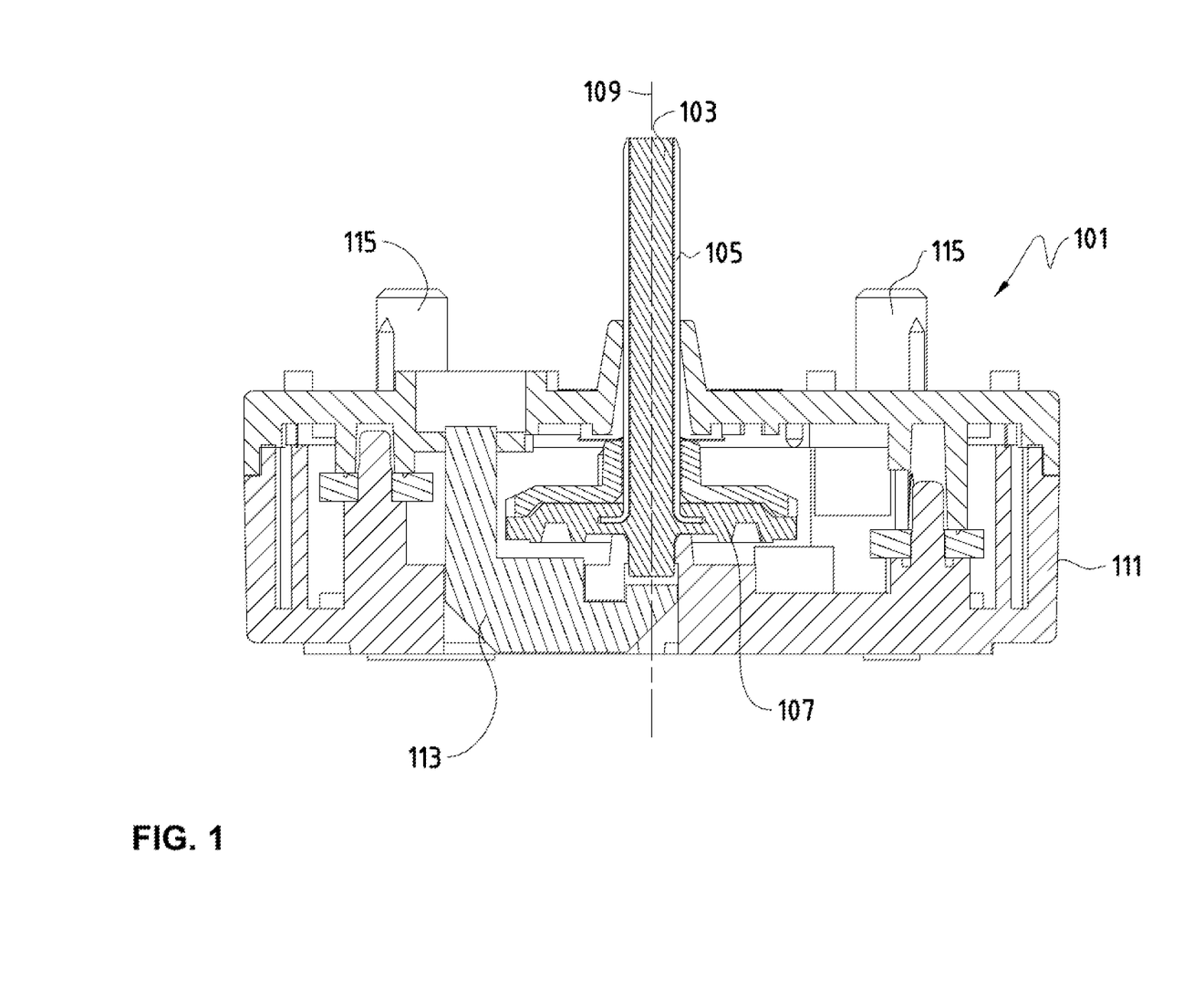
FIG. 1 is a sectional view of a stepper motor in accordance with an embodiment of the present invention.

FIG. 1 is a sectional view of a stepper motor 101 in accordance with the present invention. The motor 101 includes a pointer shaft 103 onto which a pointer (not illustrated) can be inserted. The transparent or translucent pointer shaft 103 is at least partly encased in a tube or enclosing element 105 that is arranged to reduce any stray light or block any stray light, and therefore does not disturb the cluster illumination. There is also shown a drive wheel 107 moulded over the pointer shaft 103. The drive wheel 107 is arranged to mesh with another wheel in the stepper motor 101 in order to rotate the pointer shaft 103 about the shaft axis 109. A housing 111 is also shown to protect the internal components of the motor 101.

Figure 2:
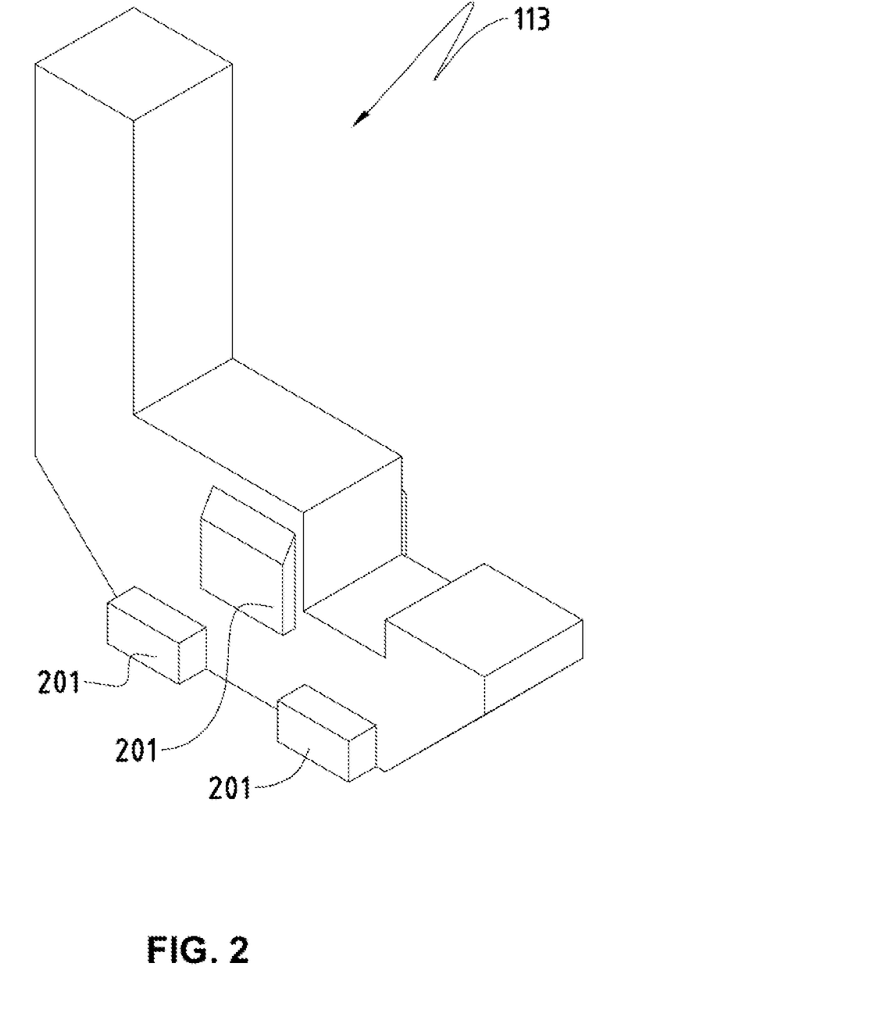
FIG. 2 is a perspective view of a light guide in accordance with an embodiment of the present invention.

There is also shown a light guide 113 (also illustrated in FIG. 2), the purpose of which is to guide light from a light source, such as an LED, to the pointer shaft 103. The light source 303 is shown for example in FIGS. 3-6. In the illustrated example, the light guide 113 is arranged to change the propagation direction of the light by substantially 180 degrees. This makes it possible to connect the light source directly to the PCB (shown in FIGS. 3-6). The light guide 113 can be made of plastic, such as polycarbonate resin thermoplastic and more specifically Makrolon® transparent, and the light guide is arranged to work as a reflective prism for the light. The light guide 113 is arranged to withstand large temperature changes, in the range of 100 degrees Celsius. The light guide has also connecting means 201, such as clips, as shown in FIG. 2, to attach the light guide to some other elements of the motor 101, and thus to hold the light guide 113 in place.

On the board-facing surface, the motor has guide pegs 115 for guiding the motor 101 to the PCB. These guide pegs 115 protrude from the board-facing surface. In this example, the motor 101 has two guide pegs 115, but of course the motor can have any other number of guide pegs. These pegs 115 are used to guide the adapter to the PCB, and do not allow reverse attachment. These guide pegs 115 allow automatic pick and place positioning when assembling different components with respect to the PCB. The guide pegs 115 have ribs 117 that are in this example made of plastic, and can deform when putting the motor onto the PCB. Thus, the motor 101 can be held firmly with respect to the PCB during the positioning phase of the motor 101.

Figure 3:
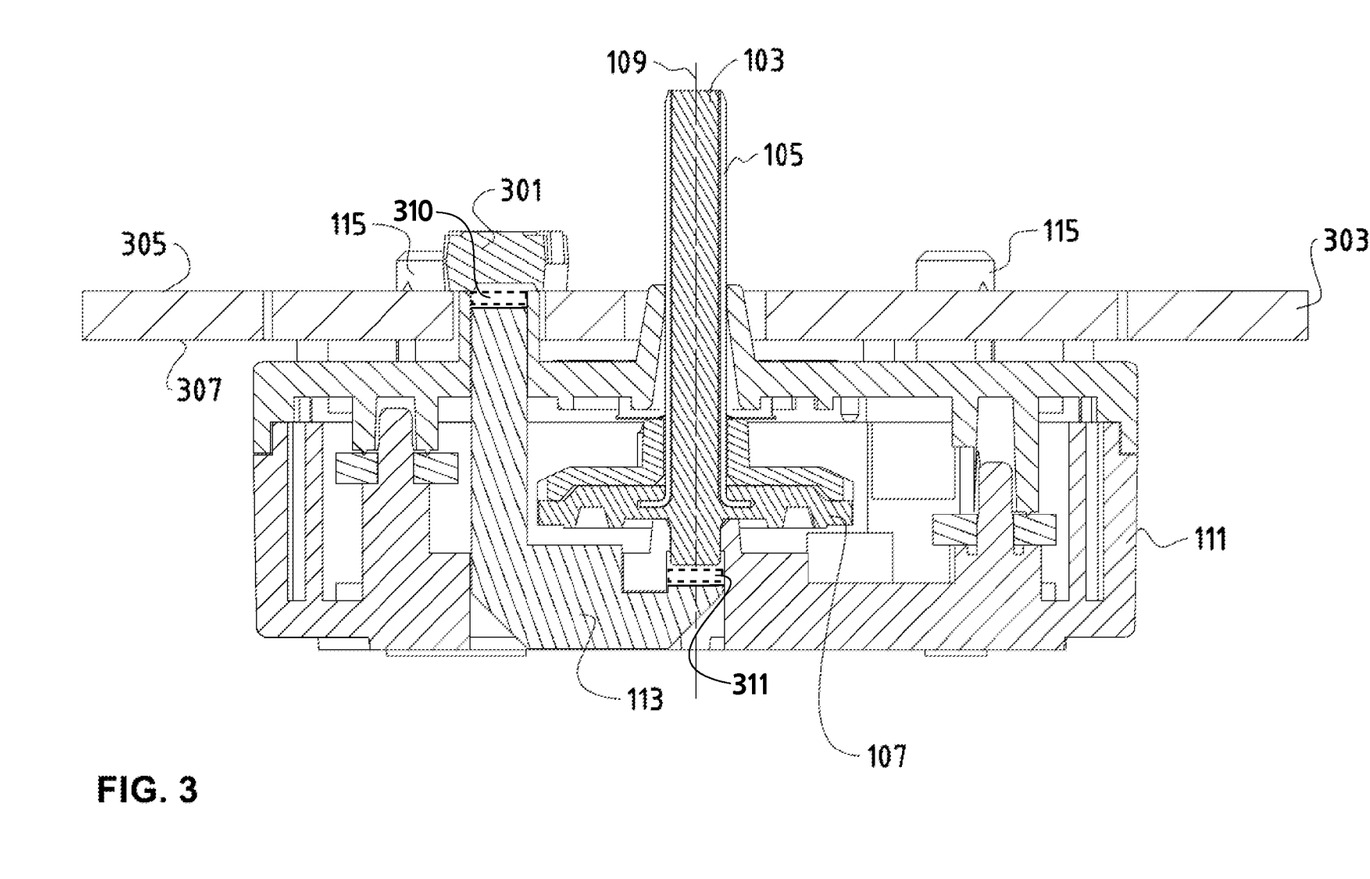
FIG. 3 is a sectional view of an assembly in accordance with a first variant of the present invention.
Figure 4:
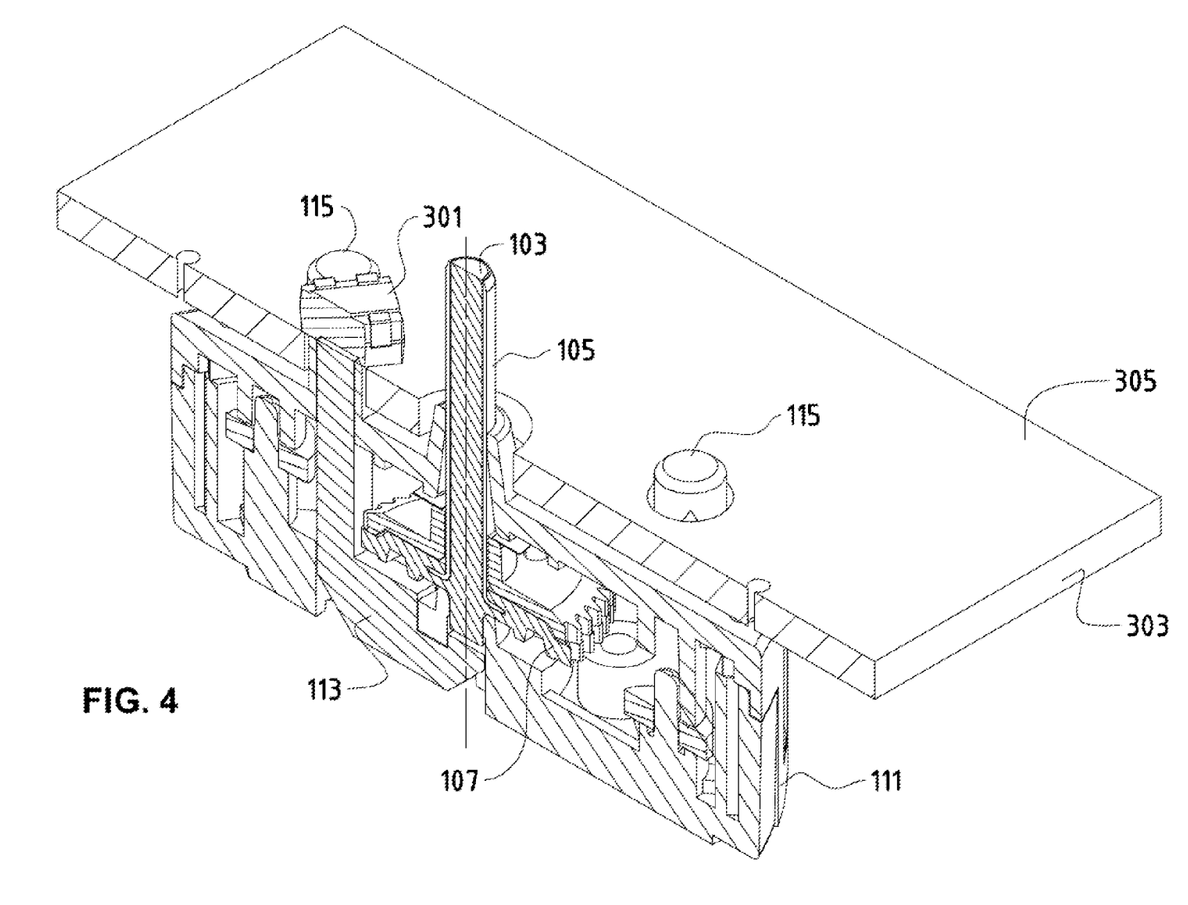
FIG. 4 is a perspective view of the assembly in accordance with the first variant of the present invention.

FIG. 3 shows in a sectional view an assembly according to a first variant of the present invention. The assembly comprises the motor 101, a light source 301, which in this example is an LED, and a PCB 303 having a front side (pointer side) 305 and a rear side 307. In this variant the LED 301 is mounted on the top of the PCB 301 (the front side 305), and it shines its light through a hole in the PCB into the light guide 113. It would also be possible to insert a lens 310 between the light guide 113 and the LED 301 to gather the light from the LED 303 and to guide the light from the LED to the light guide 113. Another lens 311 could also be inserted between the light guide 113 and the pointer shaft 103. FIG. 4 shows the same configuration, but in a perspective view and without the lenses. In this example the light guide 113 is arranged to extend all the way through the motor 101 to the LED 301. Thus, the light guide 113 goes through the PCB 303 up to the top surface of the PCB.

Figure 5:
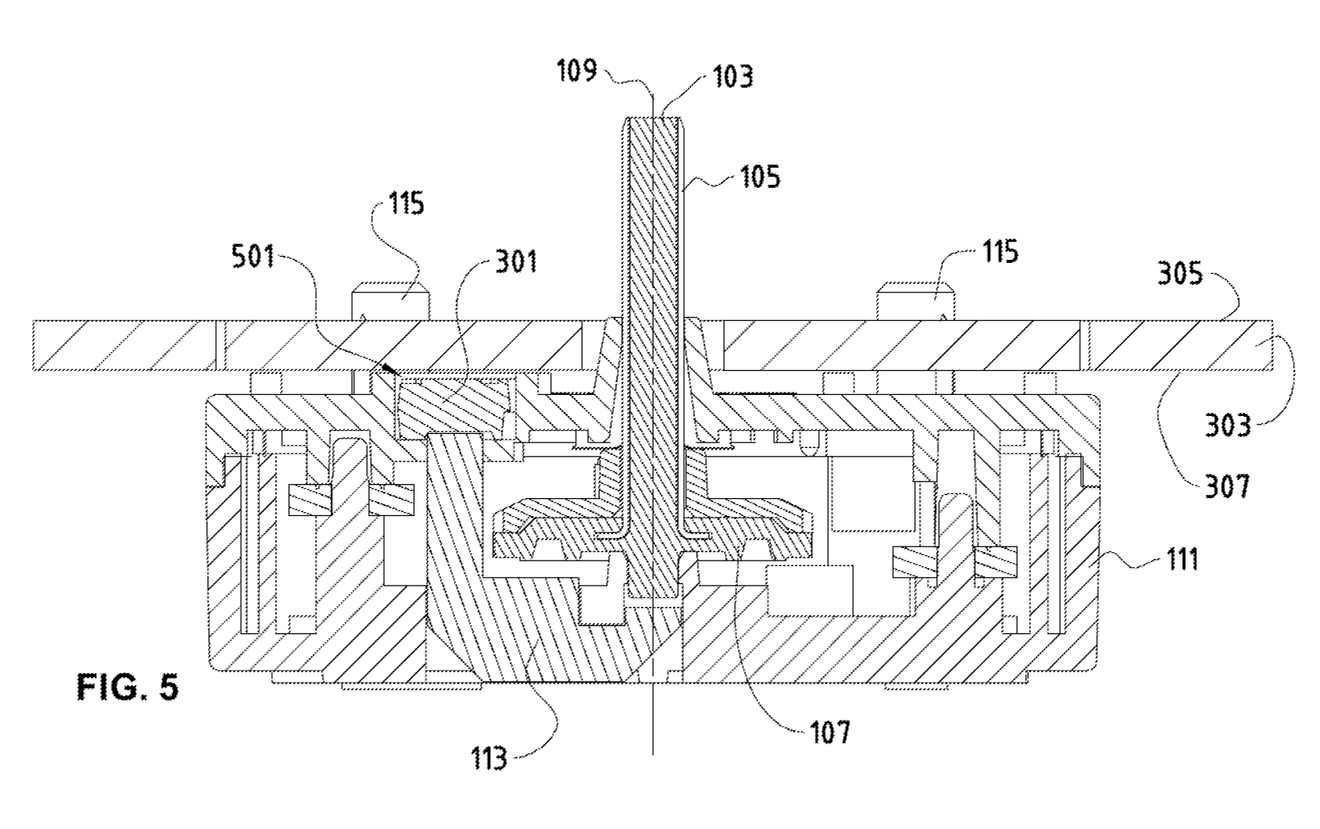
FIG. 5 is a sectional view of an assembly in accordance with a second variant of the present invention.
Figure 6:
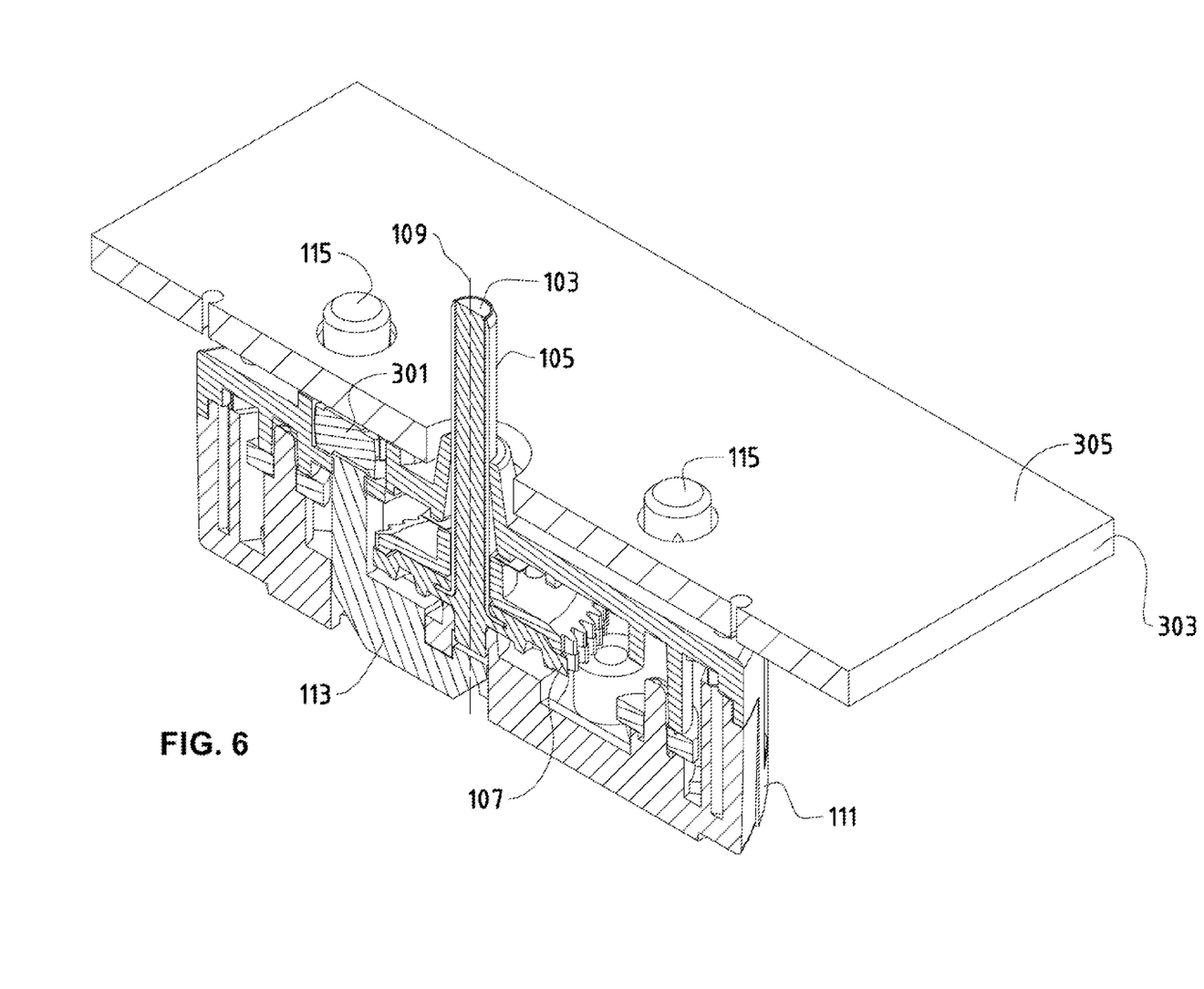
FIG. 6 is a perspective view of the assembly in accordance with the second variant of the present invention.

FIG. 5 shows an assembly according to a second variant of the present invention. Again the assembly comprises the motor 101, a PCB 303 and a light source 301. Compared to the first variant, in this variant the LED 301 is fitted onto the rear side 307 of the PCB 303, and fits into a recess 501 in the motor 101. The light emitted from LED 301 travels through the light guide 113 and up through the transparent shaft into the pointer at the end.

Figure 7:
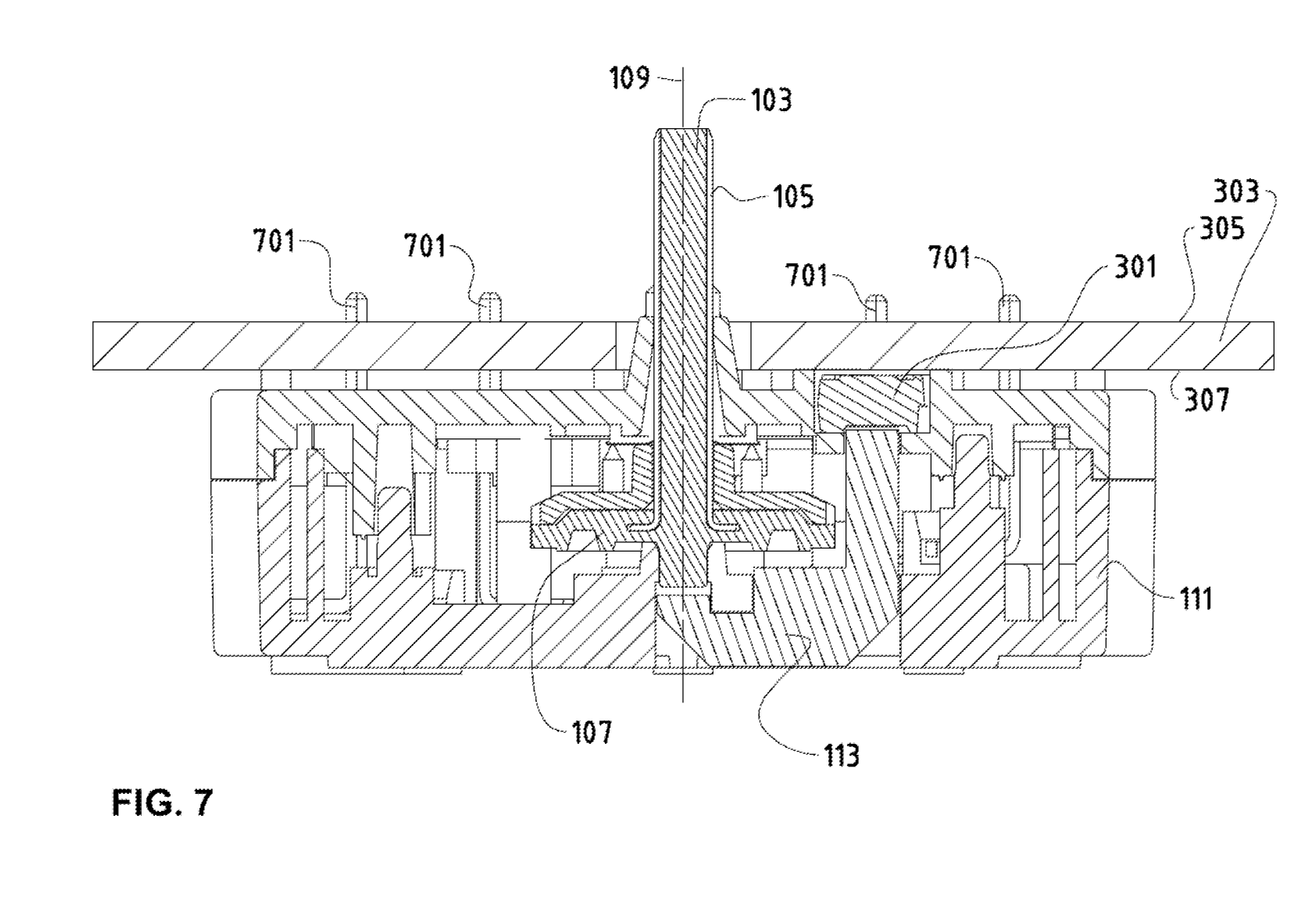
FIG. 7 is a sectional view of the assembly in accordance with the second variant of the present invention, but seen from the opposite direction as the sectional view of FIG. 5.
Figure 8:
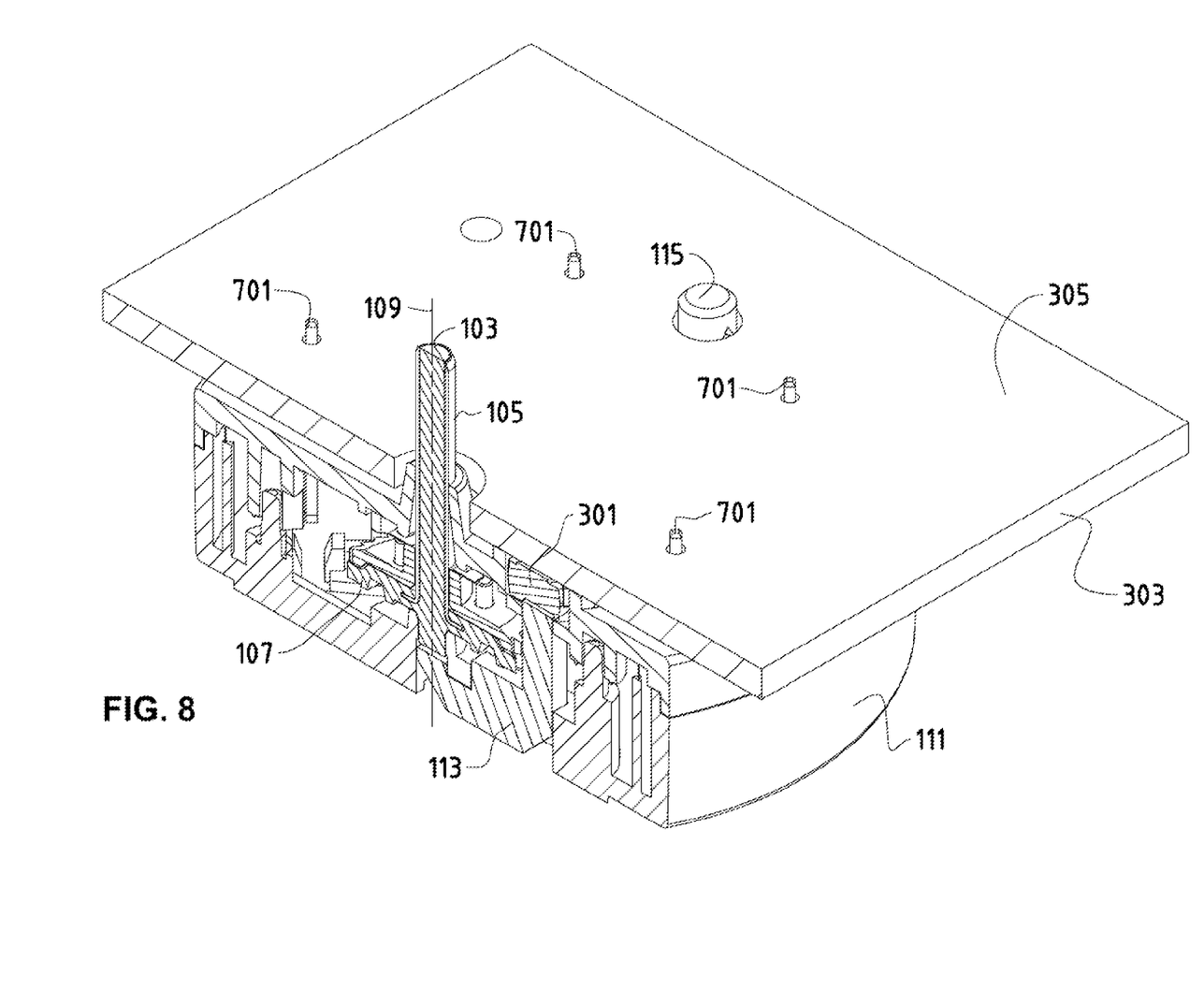
FIG. 8 is a perspective view of the assembly in accordance with the second variant of the present invention, but seen from the opposite direction as the perspective view of FIG. 6.

FIGS. 7 and 8 show also connectors 701 that are used for electrically and mechanically connecting the motor 101 to the PCB 303. These connectors 701 are in this example soldered to the PCB 303. Instead of these types of connectors, it is of course possible to use any other type of suitable is connectors, such as press-fit connectors. In this case active pegs can advantageously be also included. The active peg is a plastic peg that when inserted and pushed into the PCB, opens and mechanically locks/holds the motor in position. It is also possible to use a specifically designed motor adapter for connecting the motor 101 to the PCB 303. In this case the motor 101 can be easily removed from the adapter, if necessary.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For instance the light guide 113 can be arranged to change the propagation direction of the light by more than 180 degrees. This would be advantageous if the light source 301 is on the PCB but not emitting the light parallel to the shaft axis 109.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A motor for being mounted on a circuit board, the circuit board having a pointer side and a rear side, the motor being for rotating an illuminated pointer, the motor comprising:
   a light conveying pointer shaft for projecting through the circuit board from the rear side of the circuit board to the pointer side of the circuit board, the pointer shaft being arranged to convey light to the pointer;
   a housing; and
   a light guide for conveying light from a light source to a rear end of the pointer shaft by changing the propagation direction of the light, the rear end of the pointer shaft being on the rear side of the circuit board,
   wherein the motor is mountable on the rear side of the circuit board and wherein the light guide is inside the housing.

2. A motor according to claim 1, wherein the light guide is made of plastic.

3. A motor according to claim 2, wherein the plastic is polycarbonate resin thermoplastic.

4. A motor according to any one of the preceding claims wherein the light guide acts as a reflective prism.

5. A motor according to claim 1, wherein the light guide has means for attaching the light guide to some structure in the motor.

6. A motor according claim 5, wherein the means for attaching are clips.

7. A motor according to claim 1, wherein the motor has a circuit board-facing surface, and the motor has on the circuit board-facing surface a recess for accommodating the light source.

8. A motor according to claim 1, wherein the light guide is arranged to change the propagation direction of the light by at least 180 degrees.

9. A motor according to claim 1, wherein the motor further comprises a first lens between the light guide and the light source.

10. A motor according to claim 1, wherein the motor further comprises a second lens between the light guide and the pointer shaft.

11. A motor according to claim 1, wherein the pointer shaft is longitudinally enclosed in an enclosing element.

12. An assembly comprising the motor according to claim 1.

13. An assembly according to claim 12, wherein the light source is mounted on the rear side of the circuit board.

14. An assembly according to claim 12, wherein the light source is mounted on the pointer side of the circuit board.

* * * * *

UNITED STATES PATENT AND TRADEMARK OFFICE
CERTIFICATE OF CORRECTION

PATENT NO. : 9,306,442 B2  
APPLICATION NO. : 14/004978  
DATED : April 5, 2016  
INVENTOR(S) : Rodolfo Esposito et al.

Page 1 of 1

It is certified that error appears in the above-identified patent and that said Letters Patent is hereby corrected as shown below:

Title Page, Item (75), Inventors:
    please delete "Solothum" and insert --Solothurn--

Specification

Column 1, line 21, Please delete "m"

Signed and Sealed this
Nineteenth Day of July, 2016

Michelle K. Lee
*Director of the United States Patent and Trademark Office*